May 30, 1933.   S. WHITWORTH   1,911,415
BRAKE SHOE
Filed July 7, 1931
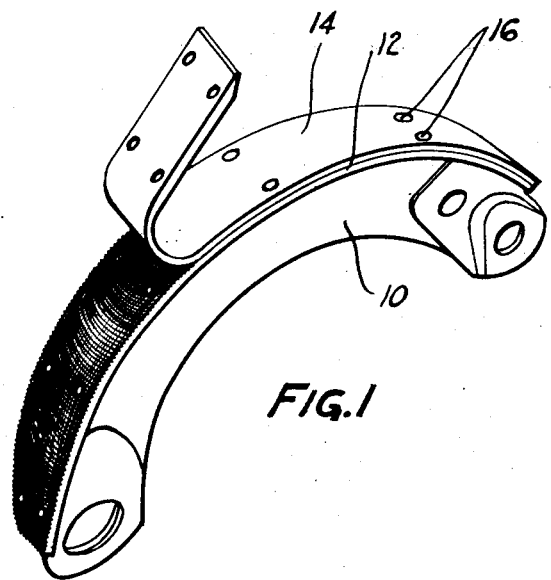
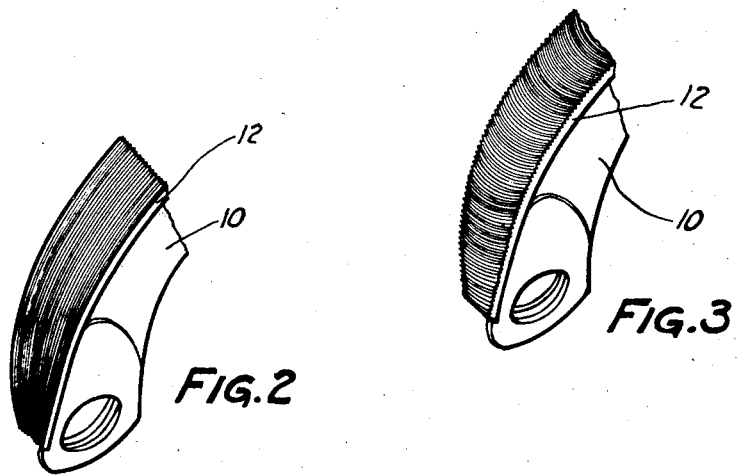
INVENTOR.
STANLEY WHITWORTH
BY
ATTORNEY.

Patented May 30, 1933

1,911,415

UNITED STATES PATENT OFFICE

STANLEY WHITWORTH, OF SOUTH BEND, INDIANA, ASSIGNOR TO BENDIX BRAKE COMPANY, OF SOUTH BEND, INDIANA, A CORPORATION OF ILLINOIS

BRAKE SHOE

Application filed July 7, 1931. Serial No. 549,225.

This invention relates to brakes, and is illustrated as embodied in a shoe for an internal expanding automobile brake. An object of the invention is to provide a surface of the shoe with projections interlocking with the brake lining or other friction facing material, thereby permitting the use of fewer rivets or other fastenings, and consequently increasing the effective area of the lining. Preferably transverse or longitudinal (or both) grooves are formed in the face of the shoe, defining teeth interlocking with and holding the brake lining.

The above and other objects and features of the invention will be apparent from the following description of the illustrative embodiment shown in the accompanying drawing, in which:

Figure 1 is a perspective of a shoe provided with both transverse and longitudinal grooves and with the brake lining partly attached;

Figure 2 is a partial perspective of a shoe with longitudinal grooves only; and

Figure 3 is a partial perspective of a shoe with transverse grooves only.

The illustrated shoe includes a web 10 and a rim 12, the outer face of which carries friction material such as a strip of brake lining 14 secured thereto by means such as rivets 16.

According to the present invention, in order to prevent shifting of the lining, and in order to permit the use of fewer rivets or the like, the outer face of rim 12 is provided with teeth interlocking with and holding the lining 14. These teeth may be defined between lengthwise grooves or cuts (Figure 2) or transverse grooves or cuts (Figure 3), but I prefer to provide both longitudinal and transverse grooves or cuts (Figure 1) defining pyramidal teeth. I prefer that the transverse cuts in both Figures 1 and 3 be cut on circular arcs instead of straight, to give additional holding effect against shifting.

While particular embodiments have been described in detail, it is not my intention to limit the scope of the invention to those particular embodiments, or otherwise than by the terms of the appended claims.

I claim:

1. A brake shoe having a face formed with both longitudinal and transverse arcuate grooves defining projections, and having a friction material secured on said face and held against shifting by said projections.

2. A brake shoe having a face formed with transverse grooves of arcuate form defining curved projections, and having a friction material secured on said face and held against shifting by said projections.

3. A brake shoe having a face formed with transverse grooves of arcuate form defining curved projections, said arcuate grooves all being of substantially the same radius.

4. A brake shoe having a face formed with transverse grooves of arcuate form defining curved projections, certain of said arcuate grooves being eccentric to others.

In testimony whereof, I have hereunto signed my name.

STANLEY WHITWORTH.